US008072418B2

(12) United States Patent
Crawford et al.

(10) Patent No.: US 8,072,418 B2
(45) Date of Patent: Dec. 6, 2011

(54) TACTILE FEEDBACK MECHANISM USING MAGNETS TO PROVIDE TRIGGER OR RELEASE SENSATIONS

(75) Inventors: David W. Crawford, Long Beach, CA (US); Susan M. Bryan, Los Angeles, CA (US); James Stephen Frankenberger, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1183 days.

(21) Appl. No.: 11/755,845

(22) Filed: May 31, 2007

(65) Prior Publication Data
US 2008/0297328 A1 Dec. 4, 2008

(51) Int. Cl.
*G09G 5/00* (2006.01)

(52) U.S. Cl. ......... 345/156; 345/168; 345/169; 345/184

(58) Field of Classification Search .......... 345/156–169, 345/173, 184; 340/407.1, 407.2; 74/471 XY; 455/575.1; 324/207.11; 178/18.03
See application file for complete search history.

(56) References Cited

U.S. PATENT DOCUMENTS

| 5,405,152 | A | | 4/1995 | Katanics et al. |
| 5,825,308 | A | * | 10/1998 | Rosenberg ....................... 341/20 |
| 6,100,874 | A | * | 8/2000 | Schena et al. ................. 345/157 |
| 6,147,422 | A | | 11/2000 | Delson et al. |
| 6,437,770 | B1 | * | 8/2002 | Venema et al. ................ 345/156 |
| 6,501,458 | B2 | * | 12/2002 | Baker et al. ................... 345/161 |
| 6,637,311 | B2 | | 10/2003 | Barden |
| 6,646,632 | B2 | | 11/2003 | Wegmuller et al. |
| 6,677,928 | B1 | * | 1/2004 | Brodey et al. ................. 345/156 |
| 6,704,001 | B1 | * | 3/2004 | Schena et al. ................. 345/161 |
| 6,762,748 | B2 | * | 7/2004 | Maatta et al. ................. 345/157 |
| 6,995,744 | B1 | | 2/2006 | Moore et al. |
| 7,038,667 | B1 | * | 5/2006 | Vassallo et al. ............... 345/184 |
| 7,113,166 | B1 | | 9/2006 | Rosenberg et al. |
| 7,138,977 | B2 | | 11/2006 | Kinerk et al. |
| 7,182,691 | B1 | | 2/2007 | Schena |
| 7,198,137 | B2 | | 4/2007 | Olien |
| 7,522,152 | B2 | * | 4/2009 | Olien et al. ................... 345/156 |
| 7,650,810 | B2 | * | 1/2010 | Levin et al. ............. 74/471 XY |
| 7,688,310 | B2 | * | 3/2010 | Rosenberg .................... 345/168 |

(Continued)

OTHER PUBLICATIONS

International Search Report; International Appl. No. PCT/US08/59090, mailed Aug. 11, 2008.

*Primary Examiner* — Prabodh M Dharia
(74) *Attorney, Agent, or Firm* — Marsh Fischmann & Breyfogle LLP; Kent A. Lembke

(57) ABSTRACT

An apparatus for providing tactile feedback to an operator. The apparatus includes first and second magnetic assemblies having first and second magnets, respectively. The apparatus further includes a user input device, such as a trigger, a knob, a release cord, or a joystick, that is connected to at least one of the two assemblies and positions the first magnet proximate to the second magnet such that interaction occurs between the magnetic fields to generate a force that is exerted on the input device. The force may be an opposing, resisting, or attractive force that creates movement of the user input such as resisting a triggering or releasing action in an interactive video game when the poles are of like polarity. The first magnetic assembly may be stationary, and the second magnetic assembly may be connected to the user input device to be positioned relative to the first magnet assembly.

21 Claims, 5 Drawing Sheets

U.S. PATENT DOCUMENTS

| | | | |
|---|---|---|---|
| 7,769,417 B2 * | 8/2010 | Tierling et al. | 455/575.1 |
| 2001/0026266 A1 * | 10/2001 | Schena et al. | 345/163 |
| 2001/0040553 A1 * | 11/2001 | Rosenberg | 345/158 |
| 2002/0067336 A1 * | 6/2002 | Wegmuller et al. | 345/156 |
| 2002/0093328 A1 * | 7/2002 | Maatta et al. | 324/207.11 |
| 2003/0126980 A1 | 7/2003 | Barden | |
| 2004/0233161 A1 * | 11/2004 | Shahoian et al. | 345/156 |
| 2006/0054427 A1 * | 3/2006 | Jasso et al. | 188/72.1 |
| 2006/0071917 A1 * | 4/2006 | Gomez et al. | 345/184 |
| 2006/0109256 A1 * | 5/2006 | Grant et al. | 345/173 |
| 2006/0293151 A1 | 12/2006 | Rast | |
| 2008/0058836 A1 * | 3/2008 | Moll et al. | 606/130 |
| 2008/0060856 A1 * | 3/2008 | Shahoian et al. | 178/18.03 |
| 2008/0106523 A1 * | 5/2008 | Conrad | 345/173 |

* cited by examiner

TACTILE FEEDBACK MECHANISM USING MAGNETS TO PROVIDE TRIGGER OR RELEASE SENSATIONS

BACKGROUND OF THE INVENTION

1. Field of the Invention

The present invention relates, in general, to user interface or input devices such as are used in video and other interactive games to control characters or action in the game, and, more particularly, to systems and methods for providing an operator of a user interface or a manipulandum with tactile or haptic feedback to realistically simulate overcoming a resistive force such as may occur when pulling a trigger, manipulating a release mechanism, or other action performed by operating a user interface or game controller in which an opposing force has to be overcome.

2. Relevant Background

Recently, there has been a growing need for devices that can allow a human operator or user to interact with a user interface that allows the operator to interact with an electronic device such as a video game played on a computing device or to perform mechanical devices remotely. When interacting with a video game, an amusement ride, or other interactive games; it is desirable for the operator to be provided with a physical sensation such as a vibration or resistive force on the user interface. In other cases, an operator may be interacting with an electro-hydraulically controlled system such as front-end loaders, cranes, and robotic equipment; and it is useful to provide the operator with feedback as to the amount of force that is being applied by or on their equipment during operations. In other cases, a surgeon may perform procedures by remotely manipulating devices implanted in a patient's body via a user interface while watching a monitor, and medical applications may demand that the remote procedures be performed based on touch. In each of these and many other applications, it is desirable to provide the operator of the user interface with physical feedback, and each of these applications may be addressed through the use of tactile or haptic feedback mechanisms or force feedback devices.

One growing application for tactile feedback mechanisms is interacting in a natural, easy-to-use, and realistic manner with computer-generated environments such as are provided in interactive games or rides at amusement parks and in video games found in more and more homes. Interface devices or game controllers are used extensively with computer systems in the implementation of computer-controlled games, simulations, and other applications very popular with the mass market of home consumers. In a typical implementation, a computer system such as a personal computer, home video game console, portable computer, stand-up arcade machine, or the like displays a graphical environment to a user on a display device or monitor. The user or operator interacts with the displayed environment by inputting commands or data by manipulating one or more actuable or movable components on the user interface or game controller. Popular interfaces include joysticks, button and joystick-based game controllers, gun or launching device with a trigger or release, mice, trackballs, steering wheels, foot or hand pedals, pads for simulating dance, or the like, and these are each connected to the computer system rendering and controlling the displayed game or interactive environment. The computer runs a game program to update the displayed interactive environment in response to input signals from the interface device based on the user's manipulation of the component (e.g., a manipulandum) such as a joystick handle, a trigger or release, a wheel, or a mouse. The computer via the game program also provides visual feedback to the user using the display screen such as displaying a projectile or object being fired or released in response to a trigger or release being pulled on the user interface.

In a growing number of interactive game interface devices, tactile or haptic feedback is also provided to the user by the user interface operating to provide physical sensations. For example, a joystick may vibrate in response to a collision occurring in a video game or a handheld controller housing may vibrate when a football player is tackled. In some interactive games and other non-game applications, the manipulandum or component handled or touched by the operator is caused to push back or resist movement in response to actions occurring in the game or in response to forces being applied on an object being controlled through operation of the user interface. It is important in many of these applications that the feedback be provided in a realistic manner such as by providing a resistive force or a vibration that is proportional or similar to that which may be experienced by a game character or to perform a game activity (e.g., pulling a trigger, turning a door knob, releasing a mechanical latch or switch, or the like). Another design issue is how to provide such a realistic physical feedback in a reliable manner that can be repeated many times without failure of the feedback mechanism and, typically, at low cost.

Tactile feedback has historically been provided in one of two ways. First, an electrically controlled actuator has been used to generate computer-controlled forces or to provide feedback to an operator of a user interface. For example, in a number of interactive games provided in amusement park settings, a powered transducer or solenoid was provided to simulate the triggering or firing of a gun, a laser device, or the like and to provide a desired "feel" or physical feedback to the user via the trigger or release on the user interface or input device. While relatively effective at providing a desired tactile feedback, these mechanisms are complex and expensive to design and manufacture, which makes them of limited value for mass production as would be the case for a typical video or computer game controller. Similarly, in a typical video game environment, motors or other actuators in the interface device or game controller are coupled to the manipulandum and are connected to the controlling computer system. The computer system receives sensor signals from the interface device and sends appropriate force feedback control signals to the actuators in conjunction with game events or actions. The actuators apply forces on the manipulandum to convey physical sensations to the user in conjunction with other visual and auditory feedback as the user is contacting the manipulandum or input portion of the user interface. These devices require power to the actuators and also call for the mechanisms to be controlled by the computer or game program run by the game processor. Actuators, furthermore, tend to require maintenance and replacement due to wear of internal components. Other disadvantages of active actuators include high cost, large size, and unwanted weight. Second, some feedback devices utilize a passive, spring arrangement to provide a detent-type mechanism. This type of feedback device is useful for eliminating the need to provide power to the feedback mechanism, can provide relatively high magnitude forces, and is typically of lower cost and weight. However, these passive devices generally experience significant wear on internal components that leads to failure and frequent maintenance including part replacement.

Hence, there remains a need for improved mechanisms for providing tactile or haptic feedback to a user or operator of a controller or interface device such as a user interface to an interactive game (e.g., a video game or computer game) and to other electrically or electro-hydraulically controlled devices (e.g., a work machine such as a backhoe, a loader, or the like or a remote surgical device or robotic device with a user interface). Preferably, such mechanisms would be less complex than existing powered actuators or devices, would be reliable to require less maintenance, be less expensive, and, in some cases, provide a smaller form factor or be provided in a smaller package or housing.

SUMMARY OF THE INVENTION

The present invention addresses the above problems by providing a tactile feedback mechanism for use in interactive video games and other applications to provide physical feedback or force sensations to an operator or user of an input device attached to the mechanism. In some implementations, the tactile feedback mechanism is used to provide tactile or haptic feedback that simulates a user operating or manipulating the input device (or manipulandum) to overcome a resistive force such as may be found in a mechanical release or latch, a trigger, or the like. The tactile feedback mechanism includes a housing with a chamber in which a stationary magnet assembly is mounted or provided and in which a positionable or movable magnet assembly is provided, e.g., a magnet assembly that can be slid in a chamber relative to the stationary magnet assembly. A user input device is attached to the positionable magnet assembly, and during operation, a user applies a force to the user input device to move or slide the positionable magnet assembly within the chamber. The two magnet assemblies include one or more magnets, e.g., permanent magnets, and are positioned in the mechanism such that when the magnets of the two assemblies are positioned adjacent each other, like poles or poles of similar polarity of the magnets are proximate to each other.

As a result, the magnetic forces generated by the magnets in the two assemblies oppose each other to generate a resistive force to the movement of the positionable magnet assembly (e.g., north or "N" poles or south or "S" poles of the magnets in the differing assemblies are positioned near each other in the chamber). This force is provided as tactile feedback to the user as they apply force to the user input device and move the positionable magnet assembly past the stationary magnet assembly. The resistive force increases as the magnets are positioned nearer and nearer in the chamber until a trigger or release point is reached and then the like poles repel each other providing feedback of the triggering or releasing of the resistive force (e.g., release of the resistive or opposing force and also, typically, applying an additive force that adds to the force applied by the operator to propel, at least slightly, the positionable magnet assembly down the chamber of the housing). The tactile feedback mechanisms described herein may be used as part of a user interface for any number of interactive video games, such as for use in amusement parks or the home/private market, and other applications in which tactile or haptic feedback is desired. The mechanisms may be particularly well-suited for implementations in which it is desired to provide feedback without powered actuators and in which the mechanisms may have a significant duty cycle, e.g., operated or triggered or cycled by users millions of times each year.

More particularly, an apparatus is provided for providing tactile feedback to a user or operator. The apparatus includes a first magnetic assembly with at least one magnet having a pole generating a magnetic field and a second magnetic assembly with at least one magnet with a pole generating a magnetic field. The apparatus further includes a user input device, such as a trigger, a release cord, a joystick, or the like, that is connected to at least one of the two assemblies and that is operable to position the first magnet proximate to the second magnet such that interaction occurs between the magnetic fields to generate a force that is exerted or acts on the user input device. The force may be an opposing or resisting force that acts in opposition to movement of the user input, and in these embodiments, the poles are of like polarity (e.g., are both North poles or both South poles). The first magnetic assembly may be stationary, and the second magnetic assembly may be connected to the user input device to be slid or positioned relative to the first magnet assembly. For example, the apparatus may further include a housing with a chamber that receives the second magnet assembly and defines its travel path in the apparatus, e.g., a travel path such as a linear or circular path that includes an interaction region in which the second magnet is positioned adjacent or proximate to the first magnet to cause the force (or range of forces) due to magnetic field interaction to be generated (such as with the first magnetic field being transverse to the travel path such that the lines of force of the magnets interact).

The apparatus may be embodied such that the first and second magnets each have planar faces (e.g., as would be found with disc, block, and other magnet shapes) and the magnets may be arranged in the assemblies such that the faces of the magnets are substantially parallel when the magnets are positioned adjacent to each other or within the interaction region. A spring or other positioning device may be included in the apparatus to apply a return/reset or positioning force on the second magnet assembly to move it out of the interaction region and/or to return it to a starting or neutral position (e.g., a default or at rest position when the user input device is not being used or the like). In some cases, one of the magnets is an electromagnet while in other implementations the first and second magnets are hard or permanent magnets such as magnets formed from rare earth magnetic material, e.g., neodymium iron boron or samarium cobalt. The poles are often positioned to have similar magnetization to repel each other in the apparatus and may be of the same or similar strength (e.g., with magnetic fields of like energy) or of differing strength. Each magnetic assembly may include one magnet or either may include more than one magnet (e.g., two in one assembly with one in the other, two in both assemblies, three in both assemblies, or another useful combination of magnets).

DETAILED DESCRIPTION OF THE PREFERRED EMBODIMENTS

Briefly, embodiments of the present invention are directed to tactile feedback mechanisms that utilize opposing or attracting magnetic forces to provide a physical feedback on a user input portion of a user interface assembly. The magnetic forces are generated by providing two magnet assemblies that are moved relative to each other such that portions of the magnets are forced into or nearly into contact. For example, the tactile feedback mechanism may include a housing that defines a chamber or bore, and a stationary magnet assembly may be provided in the housing with one or more magnets positioned proximate to the chamber. A positionable magnet assembly may be provided in the mechanism to be slid or moved within the chamber and to include one or more magnets.

During operation, the positionable magnet assembly is slid or moved within the chamber so as to position its magnet or magnets adjacent or proximate the magnet or magnets of the stationary magnet assembly. The magnets are arranged such that poles with like polarity are facing or near each other such that the magnetic fields of the magnets in the two assemblies generate an interaction region in which the magnetic fields oppose each other or generate a resistive, opposing, or attractive force to the movement of the positionable magnet assembly. This resistive or opposing force is passed or transmitted to a user input connected to the positionable magnet assembly to provide tactile or haptic feedback to the operator or user. The user interface assembly may be used in interactive video games, ride systems, attractions, and other applications to provide the feel or sensation of overcoming a resistive force, such as mechanical release or trigger. A position sensor is sometimes used to provide a position or output signal that is used by a signal processor, such as to alter a video game or other application display in response to the movement of the positionable magnet assembly. These and other features of tactile feedback mechanisms according to the invention and interactive game and machine systems that incorporate such mechanisms are described in more detail below with reference to FIGS. 1-6.

Figure 1:
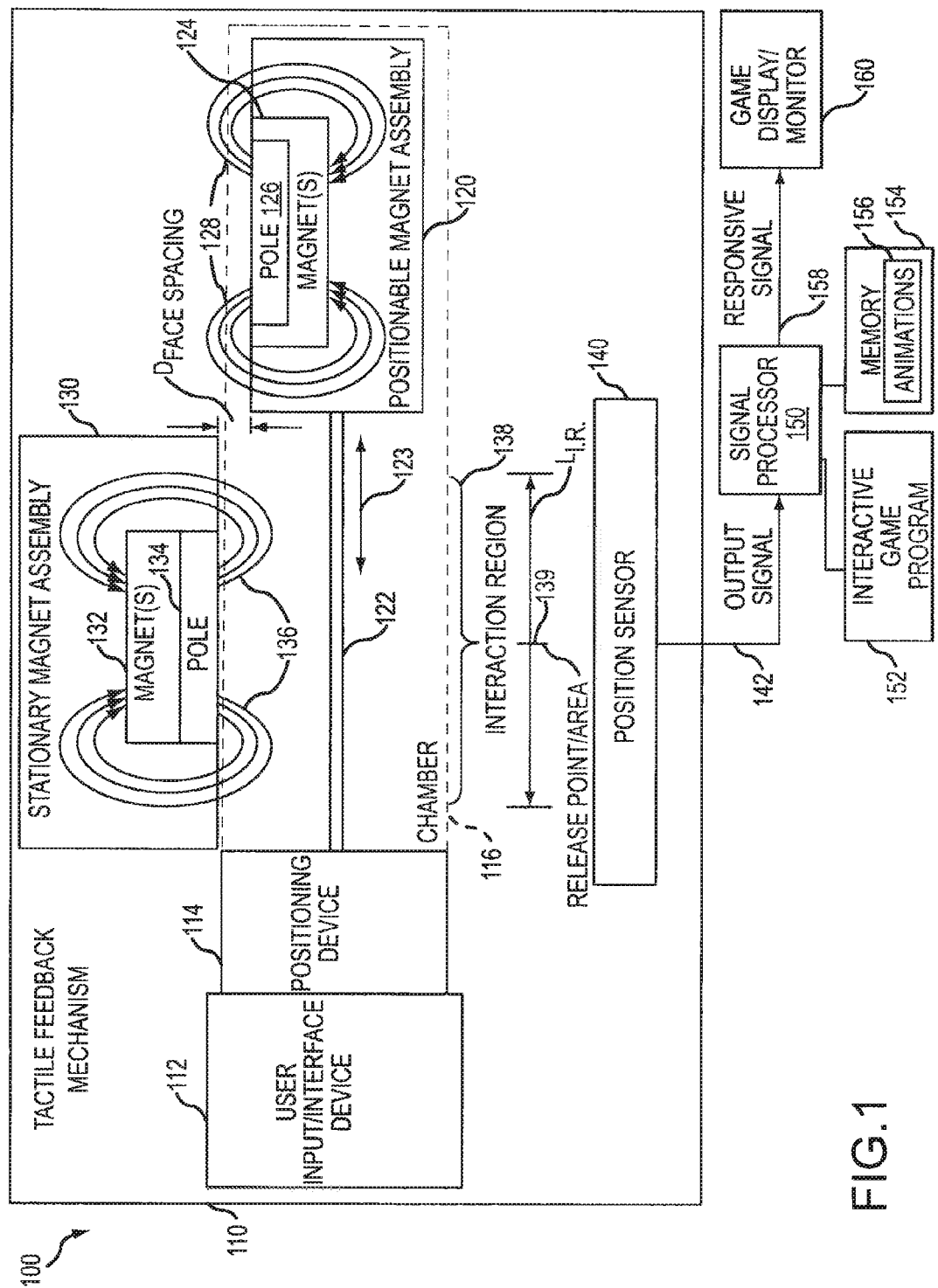
FIG. 1 is a functional block diagram of an interactive game system with a tactile feedback mechanism.
Figure 3:
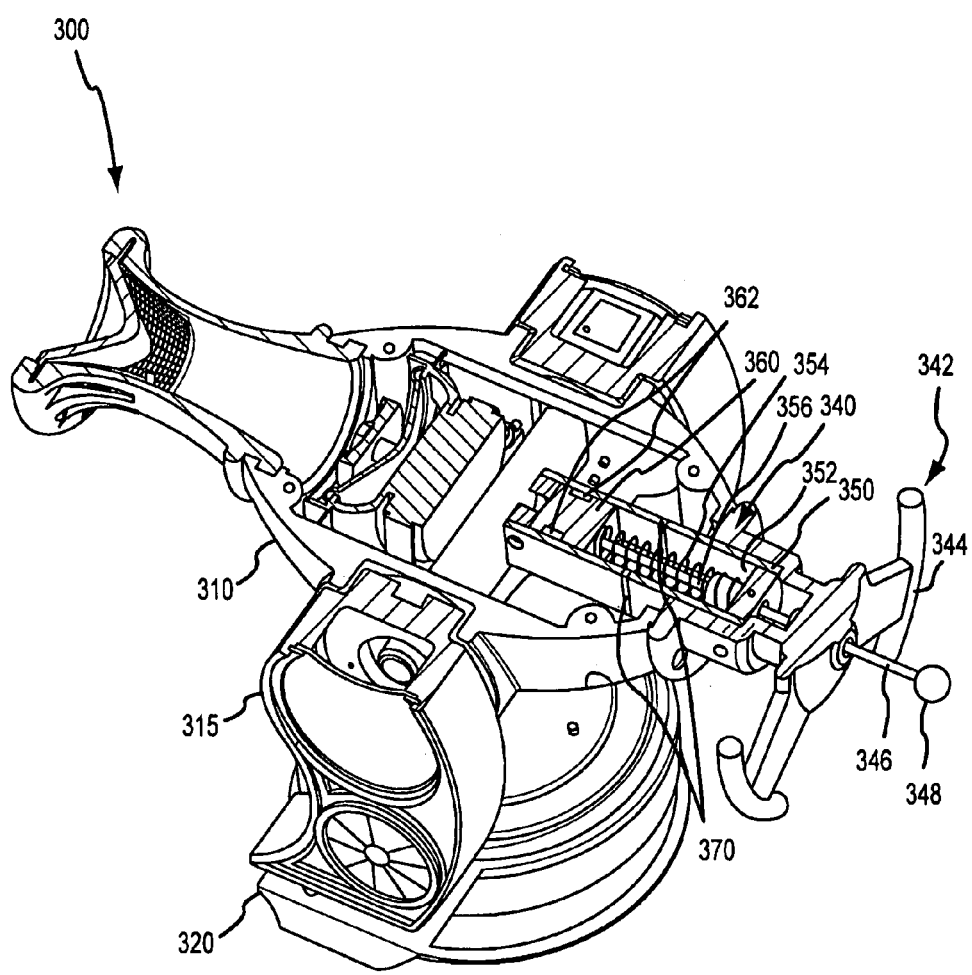
FIG. 3 is a cut-away perspective view of user interface assembly for an interactive video game, such as may be implemented in the system of FIG. 1, showing the placement of a tactile feedback mechanism according to embodiments of the invention to provide physical feedback or sensations to a user input contacted by a user or operator of the user interface assembly.
Figure 4:
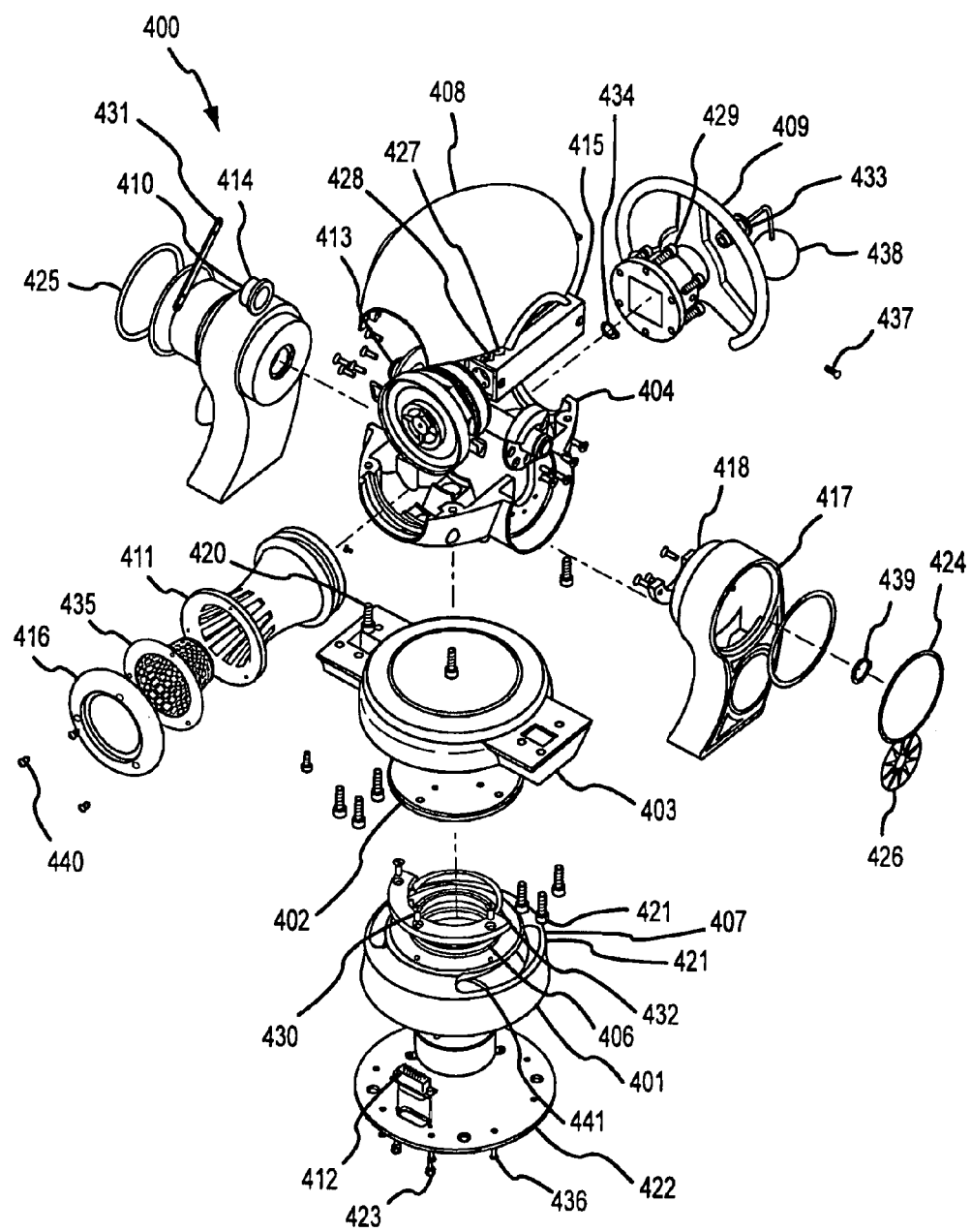
FIG. 4 illustrates an exploded, perspective view of a user interface assembly for an interactive attraction such as a video game, interactive ride, or the like, similar to that shown in FIG. 3, illustrating placement of a tactile feedback mechanism relative to a user input.

FIG. 1 illustrates one exemplary interactive system 100, such as an interactive video game or ride system, that provides tactile or haptic feedback to a user or operator through the use of a tactile feedback mechanism 110 that operates by selective positioning of magnets. As shown, the mechanism 110 includes a user input or interface device 112 such as a rotatable knob, a mouse, a joystick, a cord (or rope, chain, wire, or the like) that may be provided with a ball or other element to allow a user to pull the cord, a rod or shaft that can be pulled, pushed, or otherwise manipulated, and/or any other useful input device (such as the items discussed in the background section). A positioning device 114 is provided in the mechanism 110 with a connector 122 attached to a positionable magnet assembly 120. The user input 112, as shown in FIGS. 3 and 4, may be a simple knob or ball attached to a cord, rope, wire, or the like that is attached via connector 122 to the positionable magnet assembly 120 and during operation, a user operates the user input 112 by pulling the ball and cord to move the positionable magnet assembly in the chamber 116. The chamber 116 is generally a hollow bore or tunnel provided in a housing (not shown) and the magnet assembly 120 is sized and/or shaped to be pulled through the chamber 116.

The positioning device 114 may include a relatively simple mechanical positioner such as a spring that returns the assembly 120 to a starting or neutral position at certain operating points of the user input 112 (such as release of a pull cord, release a trigger, or the like). In other cases, the positioning device 114 may include hydraulic or electronic actuators or other devices to control or adjust the position of the magnet assembly 120 in response to control signals from a processor 150 or operation of the user input 112.

The positionable magnet assembly 120 includes one or more magnets 124 with a pole 126 that is typically positioned such that magnetic field 128 extends outward from the magnet assembly 120. For example, the North or South pole 126 of a magnet 124 may be positioned to be exposed on a surface of the assembly 120, to extend out from the assembly 120, or to be near the surface of the assembly 120 such that the magnetic field 128 extends out from the assembly 120 into the chamber 116 or beyond the walls of the chamber 116 (although this is not a requirement). During operation of the mechanism 110, the user input 112 is operated to move (as shown at 123) the positionable magnet assembly 120 in the chamber 116 relative to a stationary magnet assembly 130. The stationary magnet assembly 130 also includes one or more magnets 132 each with a pole 134 that is positioned proximate or sometimes adjacent to the chamber 116 such that the magnetic field 136 generated by the magnet pole 134 extends outward into the chamber 116 or at least transverse to or across the axis of the chamber 116. The magnet 132 may extend into the chamber 116 but, more typically, the pole 134 is provided as a part of the wall of the chamber 116 or is somewhat recessed from the wall surface.

A design parameter of the mechanism 110 is the spacing, $d_{Face\ Spacing}$, between the poles (or magnet faces) 126, 134 when the positionable magnet assembly 120 is positioned adjacent to the stationary magnet assembly 130 in the chamber 116. To obtain a stronger resistive or opposing force, this spacing, $d_{Face\ Spacing}$, may be reduced, such as to less than about a 1/16-inch gap while some embodiments may provide less than about a 1/32-inch gap, with actual contact typically being avoided to limit wear on the magnets 124, 132 and the actual spacing, $d_{Face\ Spacing}$, being varied to generate a desired opposing force and to suit the size, shape, and strength of the magnets 124, 132.

The magnetic field 136 (or its lines of force) of the stationary magnets 132 defines an interaction region 138 in the chamber 116 in which the two magnetic fields 128 and 136 interact, and the interaction region 138 has a length, $L_{IR}$, that is typically somewhat larger than the dimension of the magnet pole 134 near the chamber 116. During operation of the mechanism 110, the positionable magnet 120 is pulled or otherwise moved 123 within the chamber 116 by operation of the user input 112 until the leading edges of the magnetic fields 128, 136 contact each other and an opposing or resistive force is generated that opposes or resists further movement of the magnet assembly 120 along the axis of the chamber 116. In some embodiments, the magnitude of this resistive force increases as more and more of the faces of the poles 126, 134 are positioned adjacent to each other.

As shown, the poles 126, 134 are of similar polarity, such as both being North poles (but both could be South poles, too, to practice the invention) such that the magnetic fields 128, 136 oppose each other. In other words, the magnitude of the opposing force generated by the two magnetic fields 128, 136 increases with movement of the positionable magnetic assembly 120 and this force is transmitted to the user input as tactile feedback via the connector 122. The force generally reaches a maximum at some point in the travel, such as when the centers of poles 126, 134 are adjacent or near this position, and this point may be considered the release point or area 139. When the travel of the positionable magnet assembly 120 places the magnet 124 (or its center) passed this point 139, the opposing magnetic fields 128, 136 generate an additive or release force that assists the user of the user input in pulling or moving the positionable magnet assembly 120 further along the chamber 116 and away from the magnet 132 of the stationary magnet assembly 130. This additive force is also passed to the user input via connector 122 to provide further tactile or haptic feedback to a user or operator, e.g., to indicate a trigger has been pulled, a mechanical release has been released, or the like.

The tactile feedback mechanism 110 may be used as a standalone device for providing physical feedback to a user input 112 and, in other cases, the mechanism 110 may be used within an interactive system 100. For example, it may be useful to sense the position of the positionable magnet assembly 120 or a portion of such assembly so as to allow an operator of the user input 110 to interact with a video game or a monitored activity/environment. In one example, the user input 112 may be operated at certain points of a video game to cause an action in the game such as firing a cannon or gun, releasing an object, or the like, and the physical sensation being simulated by the mechanism 110 is the releasing or triggering of a mechanical component (such as a trigger, a release, a latch, or other component in which a physical force may resist the action).

To assist in such functionality, the tactile feedback mechanism 110 includes a position sensor 140 that functions to sense one or more positions of the positionable magnet assembly 120 in the chamber 116 and to transmit an output signal 142 indicative of the position of the assembly 120. For example, the position sensor may be a proximity sensor or optic switch or the like that senses when the magnet assembly 120 has moved to or past the release or trigger point 139 and transmits the output signal 142 in response. In other cases, Hall effect sensors may be used in the sensor 140 to determine the position of the assembly 120 in response to changes in electrical conductivity caused by the magnetic field 128. For example, two Hall effect sensors may be provided in position sensor 140 to determine when the assembly 120 is in a start or neutral position as shown and when the assembly 120 is at or just past the release point 139 (or a select portion of the assembly 120 is past the point 139), e.g., in a trigger implementation indicating when the device (e.g., the user interface device or a corresponding game object) is cocked and when it has been triggered and in a release or latch implementation indicating when the device is latched and when it is released. A variety of other position sensors may be used for or as part of the position sensor 140 to practice the invention with the above being only representative examples.

The output signal 142 is passed to a signal processor or CPU 150 that runs an interactive game program 152 and that, in some cases, has access to memory 154 storing animations or game features. The processor 150 processes the output signal and generates a responsive signal 158 that is transmitted to a game display or monitor 160, e.g., to change or modify the presently displayed game environment such as with one or more of the animations 156 to indicate the sensed position of the positionable magnet assembly 120. In the trigger implementation, the responsive signal 158 may be used to change the display on the game display 160 to show the firing of a laser, cannon, or gun while in the release implementation, it may be used to change the game display 160 to release an object (or open a door or other corresponding physical action). In one specific example, the system 100 is used as part of virtual shooting gallery as may be provided by running program 152. In this example, targets appear on the display 160 and an operator uses the user input 112 to try to hit the targets by pulling a trigger of a gun, laser, cannon, or the like simulated by the tactile feedback mechanism 110. Orientation or aiming features (not shown) may be provided in the system 100, and when the operator "fires" the cannon by pulling the trigger or trigger cord of the user input 112 past the release point 139, the processor 150 running the game program 152 generates via signal 158 a virtual projectile (such as with animation 156) that is launched toward the displayed target. Numerous other uses of the signal 142 will be apparent to those skilled in the art, and the tactile feedback mechanism 110 is not limited to use with any one particular interactive environment.

The number, size, positioning, and strength of the magnets 124, 132 may vary significantly to implement the tactile feedback mechanism 110. In one embodiment, one or both of the magnets 124, 132 are provided as electromagnets that are activated to generate the opposing electric fields 128, 136. Such an embodiment provides the advantage of allowing, in some cases, the strength of the magnetic fields 128, 136 to be varied to achieve a desired opposing or resistive force in the mechanism 110. In one implementation, the stationary magnet assembly 130 uses an electromagnet for the magnet 132 while the magnet 124 is provided as one or more permanent magnets. Although not shown, the tactile feedback mechanism 110 may also provide at least one of the stationary and positionable magnet assemblies 130, 120 through the use of an auto-energizing coil. For example, one of the magnets 124, 132 may be provided as a coil with a resistor shunt such that the coil generates a back electromotive force (or emf) that is proportional to the rate at which it moves through a static magnetic field (such as that may be provided by assembly 130 when positionable magnet assembly includes a self-energized coil to provide magnet 124). An advantage of such an arrangement would be that the feedback provided to the user input device 112 would be relatively easy to change such as by changing the resistance, and another aspect of such an embodiment is that the feedback would be automatically proportional to the speed at which a user moved the user input 112 and connector 122, which may desirable in some applications (e.g., the tactile force on user input 112 would be proportional to actuation speed and at slow speeds that force may be negligible while at high speeds the force may be relatively large).

In other embodiments, the mechanism 110 is designed to be relatively inexpensive to manufacture and to be implemented for long life with mechanical components. In these embodiments, such as may be used in an amusement park where user interface assemblies experience significant amounts of repetitive use, the magnets 124, 132 are typically permanent or hard magnets, e.g., formed of one or more materials (i.e., permanent magnet materials) that retain their magnetic properties after an applied field has been removed. To control wear, the magnets 124, 132 in one or both the assemblies 120, 130 may be coated such as with plastic, rubber, or other material. The magnets 124, 132 may be ceramic magnets or Alnico magnets or magnets formed from a number of metal elements or alloys. In some embodiments, though, it is desirable to provide relatively strong fields 128, 136 with the magnets 124, 132 and rare earth magnets are used. For example, either or both of the magnets 124, 132 may be formed using either samarium cobalt (SmCo), which provides energy products up to about 32 MGOe and is useful in higher temperature settings; or neodymium iron boron (Nd-FeB), which provides energy products up to about 55 MGOe. Neodymium iron boron or simply, neodymium magnets are useful in some cases for providing a relatively strong opposing force with relatively smaller and lighter magnets 124, 132 (e.g., disc magnets of less than about a penny's diameter or less than about 0.5-inch diameter using sintered neodymium magnets). Of course, the material (and other parameters) of the magnets do not have to be the same for each assembly 120, 130 or even within an assembly 120, 130 when more than one magnet is used in either assembly 120, 130. The shape of the magnet may also vary to suit the application and may include a disc, a cylinder, a block or rectangle, a ring, and a sphere, with a more important aspect being that the poles having the same magnetization or polarization be positioned adjacent one another when the assemblies 120, 130 are moved relative to and near each other.

Figure 2:
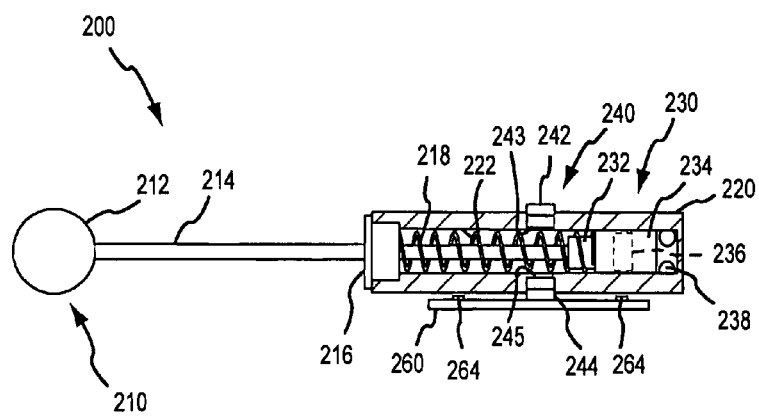
FIG. 2 illustrates an embodiment of a tactile feedback mechanism such as may be provided in the game system of FIG. 1.

FIG. 2 provides a more particular embodiment of a tactile feedback mechanism 200 such as may be used for mechanism 110 in system 106. As shown, the mechanism 200 includes a user input or interface assembly 210 that allows a user or operator of the mechanism 200 to apply a force such as a pulling force to the mechanism 200 and to feel or sense a resistive force or physical feedback generated by the mechanism 200. The user input assembly 210 includes a ball, knob, or pull 212 that is attached to an end of a rigid rod or flexible cord 214. The mechanism 200 further includes a housing 220 with a sidewall that defines an interior chamber or bore 222 such as a cylindrical shaped opening (although other cross-sectional shapes may be used), and the rod/cord 214 of the input assembly 210 extends through a cap or plug 216 to this chamber 222. A positioning device 218 is provided in the form of a spring to resist movement of the positionable or slidable magnet assembly 230 and to return the assembly 230 to its neutral or starting position (as shown) when a user releases the knob or manipulandum 212 (or releases an applied force on the knob 212).

The mechanism 200 includes a movable or positionable magnet assembly 230 and a stationary magnet assembly 240. The positionable magnet assembly 230 includes a magnet holder 234 in which a magnet 236 is received and firmly held. The magnet 236 in this embodiment is a one-piece permanent magnet, such as a neodymium magnet, that is provided as a cylindrical magnet. In other embodiments, the magnet 236 may be another shape and/or may have more than one piece such as two disc magnets provided near the surface of the holder 234. The cord 214 may be connected to the holder 234 such as via connector 232 (which may be provided for retaining an end of spring or positioning device 218) or may pass through for connection to clamp or end stop 238 (e.g., a rope clamp or the like). In one embodiment, the holder 234 and clamp/stop 238 are both circular in cross-section with a diameter that is less than the inner diameter of chamber 222 (e.g., to provide a clearance of less than about 1/16 to 1/32 inches or the like). During operation, the assembly 230 slides within the chamber 222 in response to force applied to the user input 210 that is great enough to overcome the resistive force of spring 218 as well as the resistive or opposing force of magnetic assembly 240 when the magnet 236 is drawn into an interaction region near magnetic assembly 240 (as discussed in detail with reference to FIG. 1). In typical embodiments, the assembly 230 is constrained in its travel within the housing chamber 222 such that the holder 234 and magnet 236 do not rotate to ensure alignment between magnets 242, 244 and magnet 236. If rotation is allowed, the rotation is configured such that the poles of the magnets are aligned when the magnet 236 is adjacent or proximate the magnets 242, 244 so that the magnetic fields interact to provide a tactile feedback.

The stationary magnetic assembly 240 is shown to include a pair of permanent magnets 242, 244 such as neodymium, samarium, or other magnetic material magnets. The magnets 242, 244 may be disc, block, or other shaped magnets that are, in the illustrated example, fit into a recessed surface or groove in the wall of the housing 220. In this position, each of the magnets 242, 244 has a pole 243, 245 that is positioned proximate to the chamber 222 but slightly spaced apart such that the assembly 230 does not actually contact the magnets 242, 244. In other embodiments, though, the magnets 242, 244 may be exposed to the chamber 222. Further, as shown, the magnet poles 243, 245 face the chamber 222 such that the lines of force in their magnetic fields are directed transverse to the axis of the chamber 222 and the path of travel of the magnet 236 in the positionable magnet assembly 230. The poles 243, 245 are in the illustrated embodiment like poles (such as both North or South poles of the magnets 242, 244) and are also of similar magnetization or polarity as the pole of the magnet 236 that is proximate to the chamber walls.

In this manner, the magnetic fields of the magnets 242, 244 oppose the magnetic field of the magnet 236 to generate a resistive or opposing force in an interaction region near the stationary magnet assembly 240 as the assembly 230 is slid within the chamber 222 toward the user input 210 (e.g., when the knob 212 and cord 214 are pulled). A sensor board 260 is mounted on or near the housing 220 with a pair of sensors 264, such as Hall effect sensors, that function to sense the position of the magnet 236 or movement of the assembly 230. The output signal of the sensors 264 may be processed as discussed with reference to FIG. 1 to provide further feedback to the operator of the mechanism 200 (e.g., visual and/or audio feedback in an interactive game display or the like). The size of the housing 220 and the magnetic parameters of the assemblies 230, 240 can vary significantly to implement the mechanism 200. For example, the mechanism 200 may be used as part of a user input or interface assembly for an interactive video game and be used to simulate the triggering sensation. In this and similar examples, triggering force that has to be overcome can be simulated with a relatively small mechanism by using strong magnets such as neodymium magnets. In one particular implementation, the housing is less than about 10 inches in length with a chamber having an inner diameter (i.e., circular cross-section in this case) of less than about 1 inch. Hence, the spherical, sliding magnet also has a diameter of less than 1 inch, and the two stationary or side-wall-mounted magnets are provided as disc magnets with diameters of less than about 0.5 inches. The opposing or resistive force achieved with the spring and magnetic field interaction has proven effective when transmitted via cord 214 to the input knob or component 212 for simulating the triggering or release for many game situations. The materials used in the mechanism 200 beyond the magnets may also be varied to practice the invention, and in some cases, the housing 220 and other portions are made of metals, metal alloys, plastics, or the like that are non-magnetic (e.g., are not attracted to the poles of the magnets) or such material is used for the portions of mechanism 200 that may be in proximity to the magnets during operation of the mechanism 200. Many other particular embodiments will be apparent from this description of the mechanism 200, and, of course, the invention is not limited to this example or the illustrated mechanism 200.

With this understanding of tactile feedback mechanisms understood, it may be useful to provide an example of how such mechanisms may be provided within a user interface assembly to provide a desired physical feedback to an operator. FIG. 3 illustrates a user interface assembly 300 shown as assembled with a partial cut-away or sectional view provided to show the placement of a tactile feedback mechanism 340. The assembly 300 may be used to simulate a rotatable and inclinable gun, laser, launcher, or the like that can be positioned and then triggered or released via user input provided through the tactile feedback mechanism 340 to interact with a video or similar game environment (e.g., the system 100 of FIG. 1 or the like). As shown, the assembly 300 includes a housing 310 that is pivotally mounted to a pair of arms 315, which in turn are mounted on a base 320 that can be rotated about its central axis. Such an arrangement allows an operator of the assembly 300 to "aim" the assembly 300 to target items in a game environment or to select release points or trajectories.

Within the housing 310, the tactile feedback mechanism 340 is positioned to be accessed by an operator of a user input or interface assembly 342. The assembly 342 may take any number of forms to allow the user to input energy or force to the mechanism 340 and to receive or feel responsive forces or physical feedback. In the illustrated example, the user interface assembly 342 includes steering handles or wheel 344 that are rigidly attached to the housing 310. A rod or connector cord 346 is provided that passes through the steering wheel 344 to directly connect with a slidable or positionable block 360 (e.g., a portion of a positionable magnet assembly) or to an intermediate connecting rod 356 provided in the mechanism 340. A knob or input member 348 is attached to the rod 346 to facilitate a user of the assembly 300 being able to easily apply a pulling force on the rod 346 and mechanism 340 to "trigger" or "release" an object such as a projectile from the assembly 300 (or to simulate such triggering or release in a game environment). In other embodiments, the rod 346 may be pushed to trigger an event while in other embodiments the input interface assembly 342 includes one or more of the other manipulandum discussed herein or known in the art such as a joystick, a knob, a button, a pedal, a sliding lever, a mouse, a trackball, or the like.

The tactile feedback mechanism 340 includes a housing 350 that is generally rectangular in shape and includes a chamber or bore 352 defined by its sidewalls. The chamber 352 in the mechanism 340 differs from the chamber 222 of mechanism 200 in FIG. 2 in that it has a square or rectangular cross-sectional shape. The mechanism 340 further includes a spring 354 that acts to provide some axial resistance to the sliding of the block or holder 360 within the chamber 352 and also as a positioning device that returns the block 360 to the shown at rest or starting position, such as when a user releases the knob 348. The mechanism 340 further includes a pair of block magnets 362 mounted in or on the block 360 to face or nearly abut the walls of the chamber or bore 352 (e.g., a clearance is typically provided of less than about 1/16 inches to allow the block 360 to slide easily within the chamber 352 and to achieve a desired interaction between the sliding or positionable magnets 362 and the stationary magnet(s)).

The stationary magnet assembly of mechanism 340 is shown to include a pair of block magnets 370 that are mounted or provided as an integral part of the sidewall of housing 350 such that one of their poles is exposed to the chamber 352 or is at least near the chamber 352. Again, the magnets 362, 370 may be neodymium or other magnets and are provided such that like poles of the magnets 370 and magnets 362 are positioned proximate to each other when the block 360 is slid in the chamber 352 to an interaction region proximate the magnets 370. The poles of the magnets 370 that are facing the chamber 352 may be like poles (e.g., both north poles or both south poles) or may be different poles as long as the poles of magnets 362 are similarly arranged (e.g., paired ones of the magnets in the positionable block should be of a similar polarity to the one of the magnets 370 that they are nearest to during operation of the mechanism 340).

As discussed with reference to FIGS. 1 and 2, the pairs of magnets 362 and 370 may be replaced by greater numbers of magnets (such as 4, 6, 8, or the like) or fewer magnets (such as a single block, disc, ring, or other magnet provided in the block 360 and/or housing 350). Similarly, a typical implementation may call for all the magnets used in the mechanism 340 to be of similar strength, size, and material but this is not a requirement and embodiments of mechanism 340 may call for differing materials for the various magnets and/or strengths to achieve a desired interaction between the lines of force in the various magnetic fields so as to achieve a useful haptic feedback to a user touching the knob 348 and/or cord 346. Further, the mechanism 340 and/or another mechanism not shown may be linked to the wheel 344 to provide tactile feedback to turning the wheel. Similarly, additional tactile feedback mechanisms may be provided to give tactile feedback to the user via input assembly 342 when the housing 310 is pivoted on arms 315 and/or on base 320.

FIG. 4 provides an exploded view of a user interface assembly 400 that may be used to allow a user to interact with a video game (e.g., an exploded view of the assembly 300 shown in FIG. 3). The assembly 400 functions similarly to the assembly 300, and the following description does not provide detailed explanation of each part provided in the assembly as it is believed that assembly and design of such interaction assemblies is not a limiting feature of the invention (e.g., the assembly 400 may be adapted for both rotation about the axis of a base and also for pivoting about a shaft extending through side arms). Assembly 400 does provide additional detail for facilitating manufacturing, but, more significantly, assembly 400 is useful for showing more generically a tactile or haptic feedback mechanism 415 that may take the form of any embodiment of such mechanisms described herein (e.g., with a rectangular bore, with a circular bore, with a stationary central shaft and a movable external sleeve (see, FIG. 5 for example), and with no limit on specific shape, size, or location of the opposing magnets used to generate an interaction region to achieve the tactile sensation of a resistive force that is overcome by a user-input force).

The assembly 400 includes a turret base 401, a yaw shaft 402, and a top turret 403 that are designed to provide axial rotation of the assembly 400 during operation. For assembly, a turret cover 422 is provided with fasteners 421, 423, 436 and opening or holes 430 along with retaining rings 432, 441. The base assembly further includes bearings 406, yaw stop 407 and a connector 412 for providing a power and/or communication connection for the assembly 400 (e.g., to facilitate transmittal of an output signal from a position sensor associated with the tactile feedback mechanism 415 to be transmitted to a signal processor such as shown in FIG. 1). On the top turret 403, a gid bottom 404 is mounted and which can be enclosed with a gid top 408. Arms or trunnions 410, 417 are provided to allow pivoting a muzzle 411 up and down. Assembly and structural support of these components is achieved by providing the following parts: pitch stop 418, external retaining ring 439, trunnion cover 424, decal 426, internal retaining ring 425, bushing 414, pitch bracket 431, pitch shaft 413, opening or receptacle 428, speaker bracket 427, fasteners 420 and 440, muzzle cover 416, and muzzle screen 435.

The assembly 400 includes a tactile feedback mechanism 415 configured according to one of the embodiments of the invention. The mechanism 415 is mounted to portions of a user input by retaining ring 434 and fasteners 429, 437 and held in receiving groove or opening in the handle 409. The user input further includes a rope bushing 433 for connecting a user input rope assembly 438 to the feedback mechanism 415 through the handle 409. The rope assembly 438 includes an intermediate connector rod that is attached to a rope or cord, which in turn is attached to a ball or knob that a user of the assembly 400 can grab and pull to apply a force to the mechanism 415 (e.g., a triggering or releasing force by pulling to apply an axial force on a connector to a positionable magnet assembly in the mechanism 415).

Figure 5:
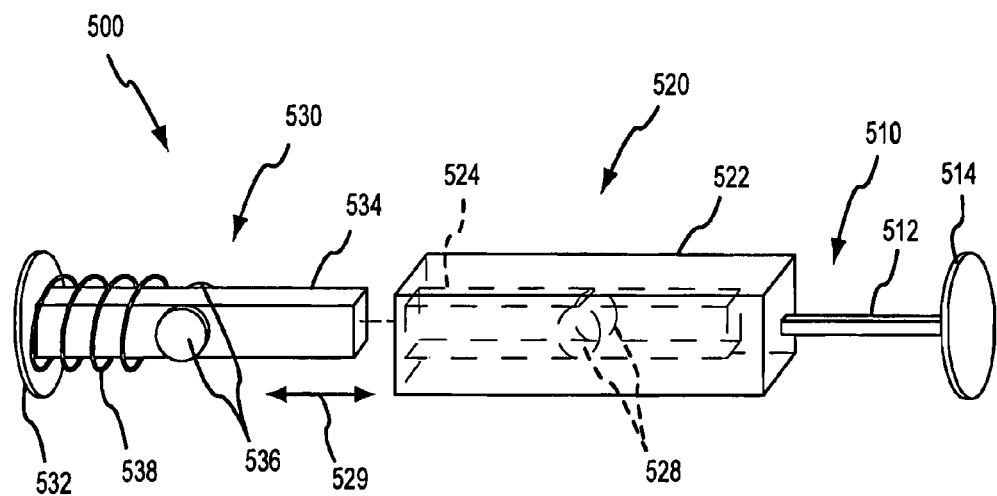
FIG. 5 is a perspective view of another embodiment of a tactile feedback mechanism showing the positionable or slidable magnet assembly removed from a stationary magnet assembly and showing use of a pair of disc magnets in each assembly to provide an opposing magnetic force during use of the mechanism.
Figure 6:
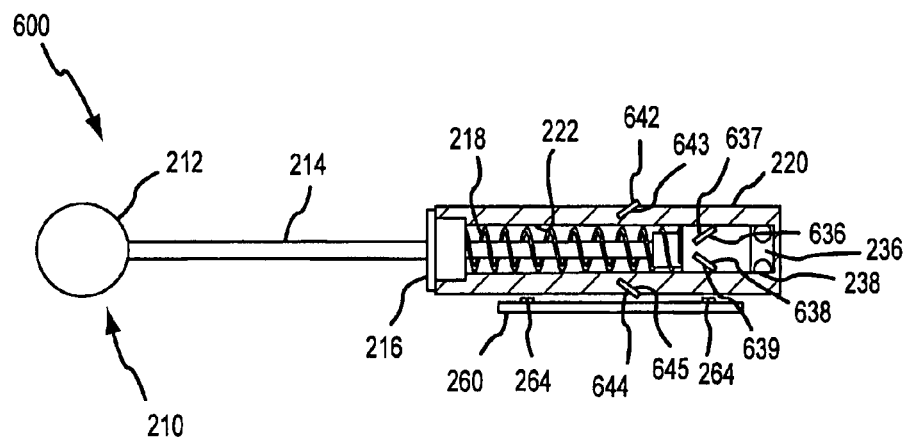
FIG. 6 is a side or partial sectional view similar to that of FIG. 2 showing a tactile feedback mechanism with differing magnet arrangements/positioning in the two magnet assemblies to obtain a differing interaction between the opposing magnetic fields of the magnets.

With the assemblies 300 and 400 of FIG. 3 and 4 understood, it may be useful with reference to FIGS. 5 and 6 to discuss alternative features and embodiments useful for implementing tactile feedback mechanisms using magnets. FIG. 5 illustrates a tactile feedback mechanism 500 that includes a user input 510 that is connected to a positionable magnet assembly 520, and a stationary magnet assembly 530. The user input 510 is similar to those discussed above with a knob 514 and a connector or rod 512 connecting the knob or ball 514 to the positionable magnet assembly 520. As shown, however, the assembly 500 is designed to provide haptic feedback when the user pushes (and/or pulls) on the knob 514. Specifically, the assembly 520 includes a housing 522, which is shown rectangular but may have a number of other cross sections such as circular, with a hollow interior or a chamber 524. The chamber 524 has sidewalls that define a bore with a cross-sectional shape selected to match a shape of rod 534 of the stationary magnet assembly 534, and, hence, the chamber 524 may be rectangular as shown or take another form such as triangular, circular, or the like. On the walls of the housing 522 a pair of magnets 528 shown in disc form as an example are mounted such that one of their poles is facing the interior chamber 524. The mechanism 500 differs in one way from the mechanism 200 in that the moving or sliding portion 520 attached to the user input 510 takes the form of a sleeve that mates with external walls of the stationary portion 530 (rather than traveling within a chamber as shown in mechanism 200).

The stationary magnet assembly 530 includes a base 532 from which a shaft 534 extends. An optional positioning device is provided in the form of a spring 538 that is fit over the shaft 534. As with chamber 524, the shaft 534 may have numerous cross-sectional shapes and lengths to practice the invention. The assembly 530 further includes a pair of magnets 536 provided on the sides of the shaft 534 (or within the shaft 534 in some embodiments). The magnets 536 are provided in the illustrated mechanism 500 as disc magnets but other shapes (and numbers) of magnets may be used. The pole facing outward from the shaft 534 of each of the magnets 536 is selected to be of the same magnetization or polarization as the pole of the magnets 528 in the assembly 520 such that when the housing 522 is slid as shown at 529 along the shaft 534, the magnets 536 oppose movement of the housing 522 by repelling the magnets 528. As shown, the faces of the magnets are positioned to be parallel in the mechanism 500 such that the lines of the force of the generated magnetic fields are also generally considered parallel, and, at least some of the interaction, may be considered a shear-like interaction that creates a resistive or opposing force opposite the direction of travel of the housing 522 and generally parallel to the central axis of the shaft 534 (e.g., in part due to the limited degrees of freedom of motion for the housing 522 in response to applied forces).

FIG. 6 illustrates another tactile feedback mechanism 600 according to the invention. The mechanism 600 is shown with many similar components as provided in the mechanism 200 of FIG. 2, and these components are numbered as shown in FIG. 2. Mechanism 600, however, differs from the mechanism 200 in its arrangement and selection of magnets to achieve the resistive force for haptic feedback on user input 210. The mechanism 600 includes a positionable magnet assembly 230 but with a pair of disc magnets 636, 638, e.g., neodymium magnets, instead of a single magnet. Additionally, the disc magnets 636, 638 are set in the holder 234 at an angle relative to the sidewall of the holder 234 adjacent the chamber wall. For example, each disc magnet 636, 638 may have a planar face 637, 639 that is provided at an angle such as 0 to 90 degrees or more typically 30 to 60 degrees from the sidewall of holder 234.

The stationary magnet assembly 240 also includes two disc magnets 642, 644 that may be provided with their faces 643, 645 parallel to the sidewall of chamber 222. Or, as shown, the faces 643, 645 of the magnets 642, 644 may be provided at an angle relative to the chamber sidewall, e.g., an angle selected from the range 0 to 90 degrees or more typically 30 to 60 degree. The angular offsets chosen for the magnets may differ between the stationary and positionable magnet assemblies 240, 230 or they may be chosen such that the faces of the magnets are substantially parallel (as shown). The tactile feedback mechanism 600 is useful for showing that the opposing magnetic fields can be provided with differing numbers and shapes of magnets and also for showing that the arrangement or positioning of the magnets may be altered to achieve a resistive or opposing force with particular characteristics (e.g., stronger applied resistive force up to the trigger or release point than the additive or post triggering force).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the examples of tactile feedback mechanisms generally have shown one of the two magnets or magnet assemblies as being stationary, but in some embodiments, both magnets or magnet assemblies are slidable or movable. This concurrent or dual movement of the assemblies is used to position like poles of magnets in the two assemblies proximate to each other to provide the tactile or haptic feedback described herein. Further, the examples shown generally are useful for providing an axial feedback force (e.g., a resistive force in an opposite direction of an applied axial force), but the embodiments of the invention are readily extendable to providing other types of feedback forces such as those opposing side-to-side movement of a joystick or other manipulandum, those opposing rotation of a user input device such as a knob, crank, or a trackball (e.g., providing force resistance in the rotary degree of freedom), and the like.

The embodiments discussed herein have generally described the arrangement of the magnets in the two magnet assemblies to be such that like poles are positioned near each other to provide a tactile sensation or feedback using opposing forces between two or more magnetic fields. In the mechanisms shown in the figures, the magnets in the two assemblies may also be arranged such that opposite poles of the magnets are positioned adjacent or proximate to each other such that the tactile feedback is provided by overcoming forces of attraction between the two nearby magnetic fields. In these embodiments, the magnets may be positioned within a housing to be slightly spaced apart and to achieve a triggering or release sensation on the user input as or after the force required to separate the two interacting magnetic fields is applied to the user input. Such use of attractive magnetic forces is considered within the breadth of the above discussion and of the coverage of the following claims.

We claim:

1. An apparatus for providing tactile feedback to a user, comprising:
   a first magnetic assembly comprising a first magnet with a pole generating a magnetic field;
   a second magnetic assembly comprising a second magnet with a pole generating a magnetic field, wherein the first and second magnets are permanent magnets;
   a user input device connected to at least one of the first and second magnet assemblies operable to position the first magnet proximate to the second magnet such that interaction between the magnetic fields generates a force that is exerted on the user input device, wherein the second magnetic assembly is linked to the user input device and, by movement of the user input device, is positionable relative to the first magnet assembly; and
   a housing with a chamber receiving the second magnetic assembly and defining a travel path for the second magnet relative to the first magnet, the travel path being defined to include an interaction region in which the second magnet is positioned in a range of spaced apart positions relative to the first magnet during positioning of the second magnet assembly in response to an input force applied to the user input device, wherein the exerted force includes an initial force opposing the input force and a secondary force that is additive to the input force as the second magnet travels in a single direction through the interaction region.

2. The apparatus of claim 1, wherein the force is an opposing force and the poles are of like polarity.

3. The apparatus of claim 1, wherein the force is an attracting force and the poles are of opposite polarity.

4. The apparatus of claim 1, wherein the chamber is elongate and the first magnet is positioned such that the magnetic field generated by the pole of the first magnet is transverse to an axis of the chamber.

5. The apparatus of claim 1, wherein the first and second magnets comprise planar faces containing the poles and wherein the faces are substantially parallel when the second magnet is positioned within the interaction region.

6. The apparatus of claim 1, further comprising a spring for applying a spring force on the second magnet assembly to move the second magnet out of the interaction region.

7. The apparatus of claim 1, wherein the first and second magnets are formed from rare earth magnetic material.

8. The apparatus of claim 1, wherein the magnetic fields generated by the first and second magnets from the poles are substantially equal in strength.

9. An interactive system, comprising:
   a user interface assembly with a housing including a user input device for receiving an input force from a user; and
   a tactile feedback mechanism positioned within the housing and operatively engaged with the user input assembly, the tactile feedback mechanism comprising means for responding to the input force by positioning a first magnet proximate to a second magnet with poles of the first and second magnets interacting to generate a force that acts on the user input device,
   wherein the poles have like polarity and wherein the force comprises an initial force that opposes the input force and a secondary force that is additive to the input force,
   wherein the magnets interact to generate the force when the first magnet is in an interaction region, to generate the initial force until the first magnet passes a trigger point, and to generate the secondary force when the first magnet passes the trigger point,
   wherein the tactile feedback mechanism further comprises a position sensor sensing a position of the first magnet and, in response, generating an output signal corresponding to the sensed position, and
   wherein the system further includes a signal processor processing the output signal and, in response, generating a signal to modify video game animation displayed on a game monitor.

10. The system of claim 9, wherein the force generated by the interacting first and second magnets includes a resistive force and the output signal is generated when the sensed position indicates the input force has overcome the resistive force.

11. The system of claim 9, wherein the responding means comprises a housing with a chamber with a sidewall and wherein the second magnet is provided in the sidewall and the first magnet is positioned within the chamber to slide relative to the second magnet in response to the input force being applied to the user input device.

12. The system of claim 9, wherein the first and second magnets comprise permanent magnets and wherein the responding means is configured such that a magnetic field generated by the first magnet has lines of force that are transverse to a path traveled by the second magnet during the positioning.

13. A tactile feedback mechanism, comprising:
   a manipulandum moveable in at least one degree of freedom in response to a user-applied force;
   a housing comprising a chamber defined by a sidewall;
   a connector operatively engaged with the manipulandum to move with the manipulandum and extending into the chamber;
   a first magnet provided in the sidewall with a pole generating a magnetic field and positioned proximate to the chamber; and
   a second magnet positioned within the chamber and linked to the connector to slide within the chamber in response to movement of the connector,
   wherein the second magnet has a pole generating a magnetic field opposing the magnetic field of the pole of the first magnet,
   wherein the second magnet is positionable in and out of an interaction region in which the magnetic fields interact to apply forces upon the second magnet and the linked connector, and
   wherein the first and second magnets each comprise at least one permanent magnet.

14. The mechanism of claim 13, wherein the magnetic field of the first magnet has lines of force that extend into the chamber and transverse to an elongate axis of the chamber.

15. The mechanism of claim 13, further comprising a position sensor sensing a position of the second magnet within the chamber and generating an output signal corresponding to the position of the second magnet, wherein the position sensor indicates when the second magnet has passed through a trigger point in the interaction region proximate to a location of the first magnet in the sidewall of the chamber.

16. A method for providing tactile feedback, comprising:
    creating a first magnetic field;
    moving a manipulandum in the first magnetic field in response to a user-applied force; and
    creating a second magnetic field that moves in response to movement of the manipulandum, wherein the second magnetic field is coupled to the manipulandum so as to provide tactile feedback via the manipulandum as the second magnetic field interacts with the first magnetic field and wherein the second magnetic field is created by providing a permanent magnet that is coupled to the manipulandum,
    wherein the moving of the manipulandum comprises moving the permanent magnet along an elongated path defined b a chamber of a housing.

17. The method of claim 16, wherein the first and second magnetic fields have opposite polarity.

18. The method of claim 16, wherein the creating of the first magnetic field comprises providing a magnetic pole proximate to the chamber at a location proximate to the path of the permanent magnet creating the second magnetic field and wherein the moving is in a single direction and the first magnetic field first applies an opposing force resisting the moving along the path and then second applies an additive force assisting the moving along the path.

19. The method of claim 18, wherein the creating of the first magnetic field comprises positioning a permanent magnet near the chamber.

20. The method of claim 16, wherein the creating of the first magnetic field comprises energizing an electromagnet that is positioned proximate to a path traveled by the second magnetic field during the moving of the manipulandum.

21. An interactive system, comprising:
    a user interface assembly with a housing including a user input device for receiving an input force; and
    a tactile feedback mechanism positioned within the housing and operatively engaged with the user input device, the tactile feedback mechanism being responsive to the input force to position a first magnet proximate to a second magnet with poles of the first and second magnets interacting to generate a tactile feedback force that acts on the user input device,
    wherein the tactile feedback force comprises an initial force that opposes the input force and a secondary force that is additive to the input force and
    wherein the first and second magnets interact to generate the tactile feedback force when the first magnet is positioned within an interaction region in the housing, to generate the initial force within the interaction region until the first magnet is moved to a trigger point, and to then generate the secondary force urging the first magnet out of the interaction region.

* * * * *

UNITED STATES PATENT AND TRADEMARK OFFICE
CERTIFICATE OF CORRECTION

| | | |
|---|---|---|
| PATENT NO. | : 8,072,418 B2 | Page 1 of 1 |
| APPLICATION NO. | : 11/755845 | |
| DATED | : December 6, 2011 | |
| INVENTOR(S) | : Crawford et al. | |

It is certified that error appears in the above-identified patent and that said Letters Patent is hereby corrected as shown below:

Column 17, line 15, delete "b" and insert therefor --by--.

Signed and Sealed this
Thirty-first Day of January, 2012

David J. Kappos
*Director of the United States Patent and Trademark Office*